(12) United States Patent
Marra, III et al.

(10) Patent No.: US 6,747,431 B1
(45) Date of Patent: Jun. 8, 2004

(54) CALIBRATION TECHNIQUE FOR ELECTRIC MOTOR

(75) Inventors: Michael Anthony Marra, III, Lexington, KY (US); Randall David Mayo, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 159 days.

(21) Appl. No.: 09/930,793

(22) Filed: Aug. 16, 2001

(51) Int. Cl.[7] .............................................. G05B 11/28
(52) U.S. Cl. ...................... 318/599; 318/138; 318/434; 318/439; 318/254
(58) Field of Search ................................ 318/138, 254, 318/434, 439, 599

(56) References Cited

U.S. PATENT DOCUMENTS

| | | | |
|---|---|---|---|
| 4,103,216 A | | 7/1978 | Hayes |
| 5,202,613 A | * | 4/1993 | Kruse .......................... 318/254 |
| 5,321,342 A | | 6/1994 | Kruse |
| 5,436,545 A | * | 7/1995 | Bahr et al. ................... 318/727 |
| 5,483,141 A | * | 1/1996 | Uesugi ........................ 318/811 |
| 5,893,658 A | | 4/1999 | Kellie et al. |
| 5,982,130 A | | 11/1999 | Male |
| 6,002,234 A | | 12/1999 | Ohm et al. |
| 6,445,155 B1 | * | 9/2002 | Williams et al. ............ 318/727 |

* cited by examiner

Primary Examiner—Robert Nappi
Assistant Examiner—Tyrone Smith
(74) Attorney, Agent, or Firm—Kean, Miller, Hawthorne, D'Armond, McCowan & Jarman, L.L.P.

(57) ABSTRACT

A method for calibrating electric motors using current-sensing only is disclosed. The method involves applying a voltage in pulse-width modulated fashion for a short time to insure motion of the motor. Following startup, varying voltages are pulsed to the motor, switching polarity at regular intervals. The current generated in the motor by each level of voltage is measured. The data generated provide a reasonably accurate view of the properties of the motor, allowing for more precise velocity control.

15 Claims, 3 Drawing Sheets

CALIBRATION TECHNIQUE FOR ELECTRIC MOTOR

TECHNICAL FIELD

This invention relates, generally, to calibration techniques for velocity controllers, and more specifically, to such techniques as applied to electric motors used in printers.

BACKGROUND ART

Computer printers used a variety of motors to actuate pumps, move components, and perform many other functions. In one type of configuration, a Pulse Width Modulated (PWM) signal is supplied to a DC motor. The DC motor may be used, for example, to power a mechanism that primes and purges the print head. In such an application the mechanism will have a well-defined travel path and pre-set hard stops.

With these conditions, it is important that the PWM signal is sufficient w so that the motor moves the mechanism to its various stops. However, if the PWM signal is too strong the motor can move the mechanism too quickly. These movements can cause ink to be thrown off of the mechanism or can cause damage to the mechanism or other components.

To control the speed of motors one can employ a proportional integral controller which uses a feedback system based on the motor speed. However, the sensors used to detect the speed can be expensive and can add to the sophistication of the overall system. In low-cost applications these sensors can also create a degree of velocity control and position control which is beyond the requirements of the application. In the printer purge application one is concerned about the motor having velocity in a proper range. However, precise velocity control and precise position control are not as great a concern as they might be in other applications.

It is possible to have sufficient control over a motor for printer purge applications without using expensive sensors. With the addition of an adequate technique to overcome measurement noise, motor variation, and load variations, a feedback system based on the current in the motor can be satisfactory. However, no known system based on current sensing only can achieve the necessary results without the use of a relatively expensive motor.

What is needed in the printer purge and other similar applications is a calibration technique which enables a velocity controller to overcome the limitations of inexpensive motor designs, particularly 3-pole DC motors, so as to permit sufficient velocity control to keep the motor within a range that prevents undesirable consequences but which does not require expensive sensors.

DISCLOSURE OF INVENTION

It is an object of the present invention to provide a calibration technique for electric motor velocity controllers which allows for relatively precise control over inexpensive motor designs.

It is another object of the present invention to provide a calibration, technique for velocity controllers using current sensing only.

It is another object of the present invention to provide a calibration technique for velocity controllers which do not require the use of optical or other sophisticated sensors.

It is another object of the present invention to provide a calibration technique that will enable a velocity controller to operate properly in the presence of measurement noise, motor variations, and load variations.

A calibration technique for electric motor velocity controllers is provided. The method gives velocity controllers that are limited to current sensing only a level of accuracy sufficient for many applications, even when utilizing inexpensive motors.

The invention is based on the concept that variations in the motor parameters and the current sensing circuitry cause variations in the apparent resistance of the motor. By identifying the true value of the apparent resistance, the mapping function can be adjusted for optimum performance. This is accomplished through the application of a specific cycle of pulse-width modulated voltages (PWM), as is explained more fully below.

An advantage of the invention is that it eliminates the need for optical or other more complicated velocity sensors.

A further advantage of the invention is that it enables a velocity controller using current sensing only to sufficiently direct relatively inexpensive motors.

A further advantage of the invention is that it enables a velocity controller to operate properly in the presence of measurement noise, motor variations, and load variations.

These and other objects, advantages, and features of this invention will be apparent from the following description.

BEST MODE FOR CARRYING OUT THE INVENTION

A common way to determine the velocity at which at a motor is operating is to measure the back EMF in the motor, which is directly proportional to its velocity. The two values are related by the back EMF constant of the motor, a known value.

Using the simple relationship of Ohm's Law, the back EMF can be determined through measuring the current in the motor. However, in order to accomplish this, an accurate estimate of the resistance of the motor must be made. The apparent resistance will vary according to the temperature of the windings, variations in the circuitry, and other factors.

The apparent resistance is determined according to the invention by taking numerous current samples as described below. From these measurements, a voltage/current curve is generated. This curve is used to generate a mapping function for use in the velocity controller, which accounts for any variations in the apparent resistance of the motor.

When the motor is moving, back EMF is generated in the motor. The greater the back EMF, the more error is introduced because back EMF is assumed to be zero in constructing the calibration curve. Therefore it is vital that that the motor not be moving at significant speeds when the current is measured.

Measurement of the current with the motor stopped is not an acceptable option because certain inexpensive motors, particularly 3-pole DC motors, exhibit a wide variation in resistance depending on position of the rotor. This variation is caused when a brush spans two commutator segments, effectively causing no current to flow in one of the windings. Without the use of equipment to sense the position of the rotor, any measurement of the current while the motor is stopped is of dubious value. Therefore, the current must be measured while the motor is moving to obtain accurate readings.

The solution to this problem is to measure the current in the motor when it is moving very slowly and to use an average of multiple measurements. Also, in a preferred embodiment the PWM versus current curve includes a range of PWM values to insure accuracy at all points on the curve. Low PWM values are particularly important due to mechanical and other factors.

Figure 1:
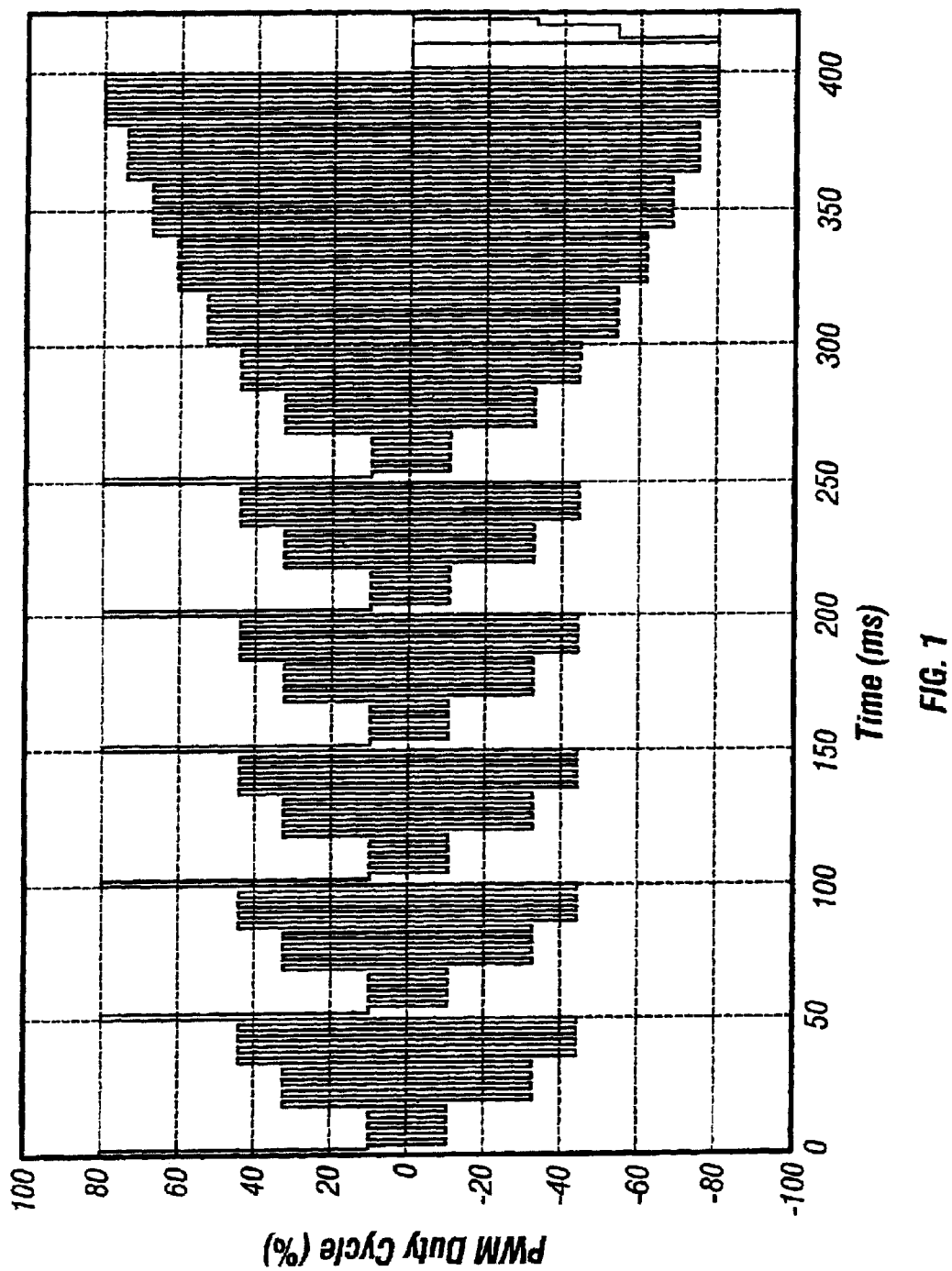
FIG. 1 is a graph showing a complete calibration cycle according to a preferred embodiment of the invention.

FIG. 1 shows a complete calibration cycle according to a preferred embodiment of the invention, which will provide an accurate voltage/current curve. The figure shows five identical segments followed by one additional segment. To begin, the PWM duty cycles of interest must be determined. In FIG. 1, the values used are 10%, 32%, 44%, 53%, 61%, 68%, 74%, and 80%. This spread is a typical example of a preferred embodiment of the invention as it provides sufficient measurements over the range of possible values of the PWM duty cycle. To insure accuracy in the range of small PWM duty cycles, more measurements are taken at low values of PWM.

Although the preferred embodiment utilizes pulse-width modulated voltage, direct current can also be used. The average voltage applied to the motor will be the same. Previously, the cost of direct current systems did not compare well to PWM systems, but improvements in the technology have made them comparable.

For the PWM voltage application, starting at time zero, an 80% duty cycle is pulsed for two milliseconds. This is the startup PWM duty cycle. A chopping period of around 50 microseconds is effective and does not create a significant amount of audible noise. Other periods may be used, however. An 80% duty cycle is used here, but any value sufficient to guarantee motion of the motor, which is required by the variability in the resistance of the motor at a stopped position, will work. Then, the first three duty cycles are tested, running through each in succession, and repeating five times.

Figure 2:
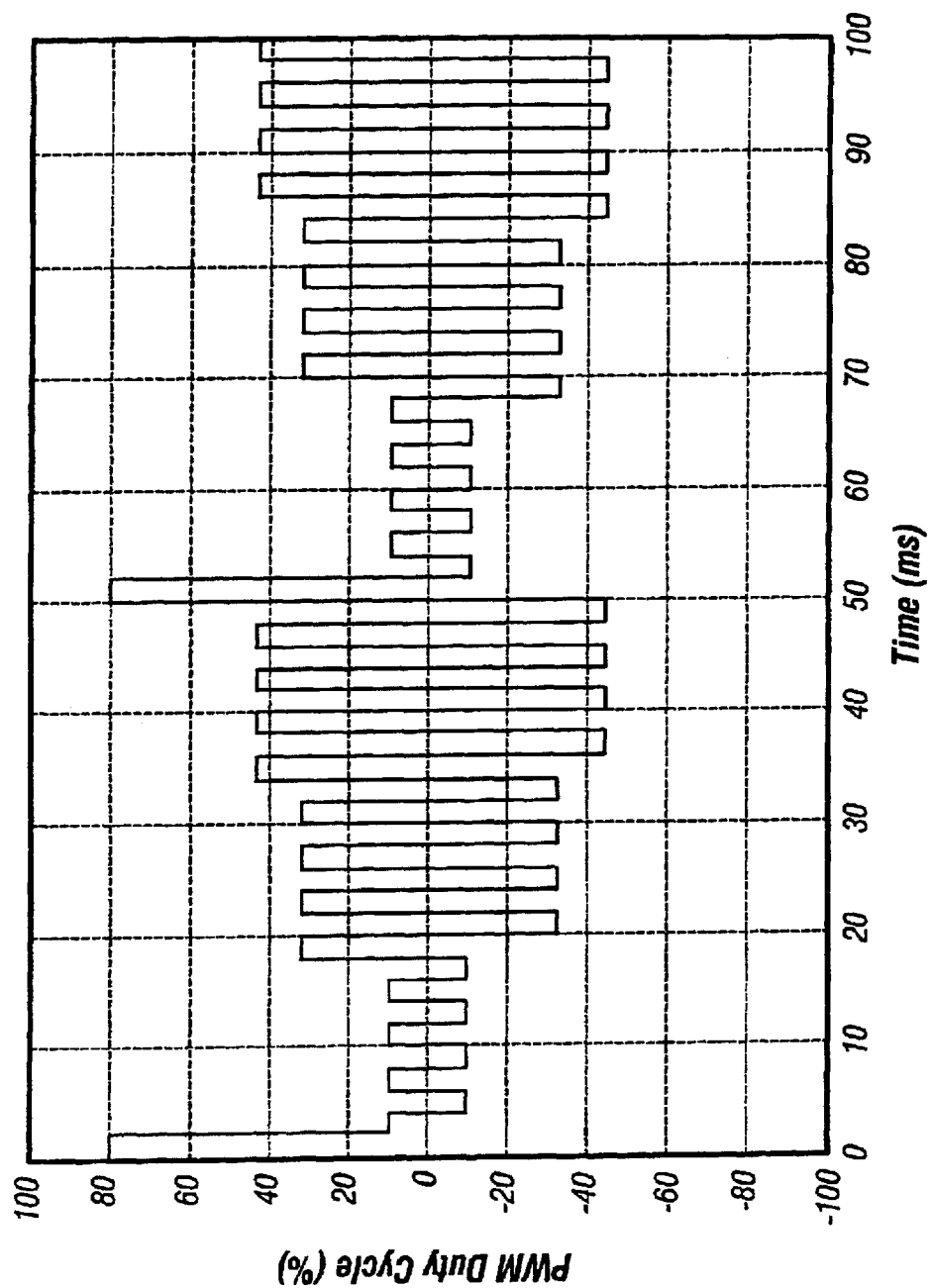
FIG. 2 is a zoomed view of the first two segments of the above calibration cycle.

FIG. 2 shows a zoomed view of the first two of five segments of a preferred embodiment where small PWM duty cycles are tested. Following the initial 80% cycle, a first test of the lowest chosen duty cycle (10%) is performed. It is desirable to perform the tests in order from low duty cycles to high duty cycles. The first test consists of eight distinct periods. Each period is a series of pulses over a two-millisecond time span. A two milliseconds period is used in the example, but this can be varied. Between each period, the polarity is shifted to alternate between +10% and −10%, and the current is measured during each. The current should preferably be measured multiple times during each period to obtain the smoothest results. Also, it is desirable to take the measurements near the end of the period so that the motor is approaching steady-state for that particular PWM.

Following these eight periods, the next duty cycle is tested. This consists of eight periods at 32%, alternating between positive and negative, as before. The current is again measured during each period. Then the 44% duty cycle is tested in exactly the same way, taking the appropriate current measurements.

This completes the first segment. The process is repeated five times, with each segment beginning with an 80% pulse to ensure motion of the motor. Thus far in the process, forty periods of each duty cycle will have passed. The number of measurements of current in the array will be forty times the number of samples taken during each period. The samples are summed and then scaled to a conveniently usable value.

Figure 3:
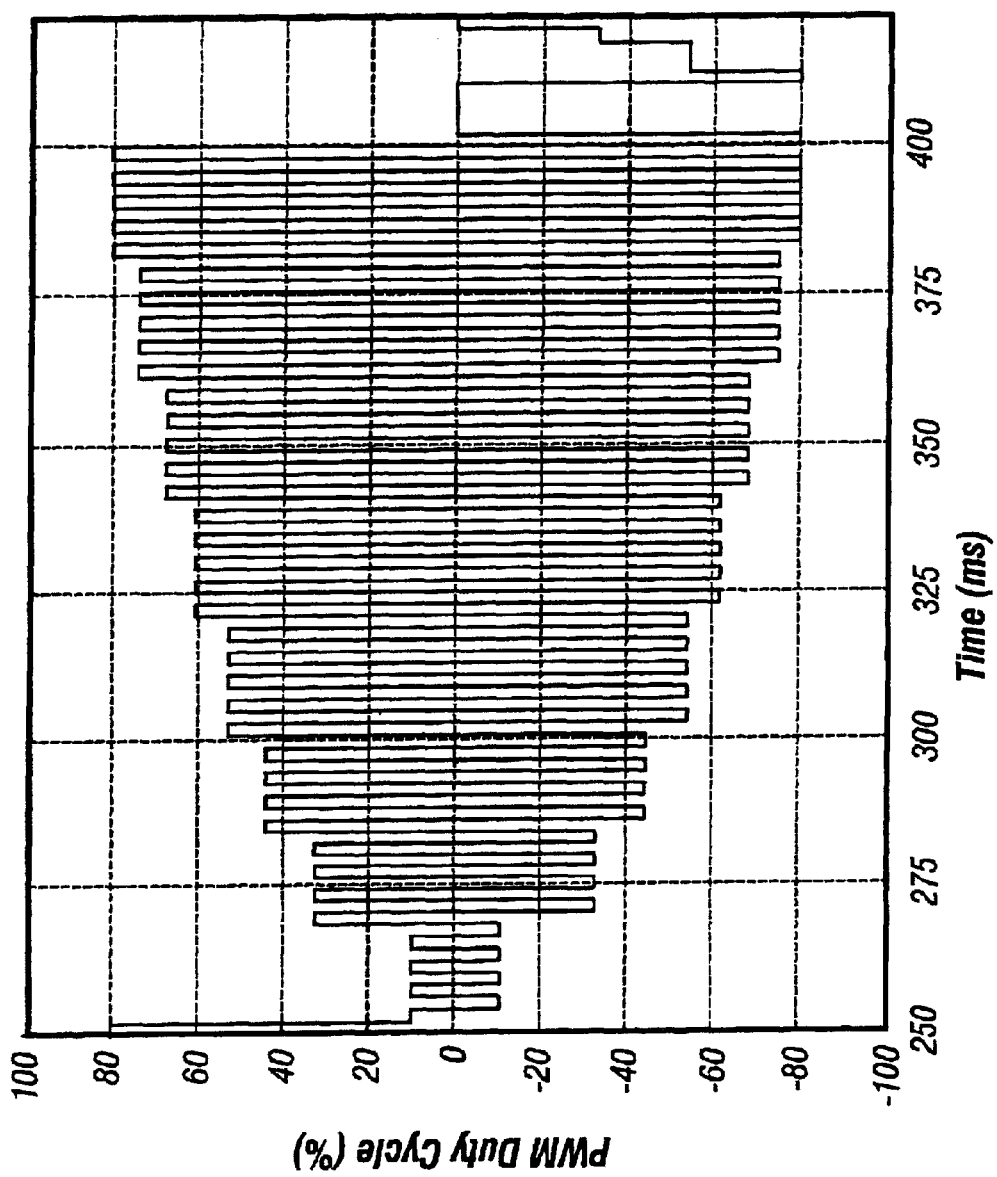
FIG. 3 is a zoomed view of the final segment of the above calibration cycle.

Following the first five segments of the calibration cycle, the entire range of PWM duty cycles is tested. This is seen most clearly in FIG. 3, which is a zoomed view of the sixth and final segment As before, each of the low duty cycles is pulsed for eight periods, alternating between positive and negative values. The current is measured during each period. The high duty cycles are pulsed for ten periods. The last 20 milliseconds of FIG. 3 show a waveform designed to return the motor to its initial stop position, which is desirable but not required.

The current values measured for each duty cycle are summed and stored. The entire calibration routine is then repeated three times, recording an independent array for each run. For each duty cycle, this leads to three arrays and three values for the scaled current. The lowest of the three values should be selected as this corresponds most closely to the average current in the motor. Then, by plotting each PWM versus its measured current, the proper mapping function is determined, leading to greatly increased precision of control. The mapping function is used to estimate the velocity of the motor at any given time, using current-sensing only. Although the specifics of the velocity controller are beyond the present invention, this calculation may be facilitated by the use of fuzzy logic methods.

The values for the duty cycles used above are not required, but instead are provided merely by way of example. The use of eight values provides enough PWM versus current pairs to properly determine the mapping function. More or fewer values can be used as demanded by an individual application. The period width of two milliseconds is similarly not required, although it is a preferred embodiment.

After the calibration above has been completed, only a small calibration may be required at the beginning of each operational motor movement. A sufficiently large PWM, such as 60%, is applied, and the current is measured. This will check for variables such as motor heating. The table entries previously generated are scaled linearly based on this measurement.

There are, of course, other alternate embodiments which are obvious from the foregoing descriptions of the invention, which are intended to be included within the scope of the invention, as defined by the following claims.

What is claimed is:

1. A method of calibrating a DC motor, comprising the steps of:
   a) choosing at least one PWM duty cycle value of interest;
   b) applying a startup PWM duty cycle of sufficient magnitude to insure motion of said motor;
   c) performing a first test wherein the first chosen duty cycle is applied in at least two periods, each of said periods being of opposite polarity from the period preceding it, and the current in the motor is measured dig each of said periods;
   d) performing a test for each additional chosen PWM duty cycle value of interest, wherein each of said PWM duty cycles is applied in at least two periods, each of said periods being of opposite polarity from the period preceding it, and the current in the motor is measured during each of said periods; and
   e) calculating the apparent resistance of the motor.

2. The method of calibrating a DC motor of claim 1, wherein at least two PWM duty cycle values of interest are chosen.

3. The method of calibrating a DC motor of claim 1 further comprising the steps of:
   a) applying a PWM sufficient to move said motor prior to each operational movement of said motor;
   b) taking a supplemental measurement of the current in said motor; and
   c) modifying said calculated apparent resistance.

4. The method of calibrating a DC motor of claim 1, wherein the test for each chosen PWM duty cycle values of interest comprises at least four periods.

5. The method of calibrating a DC motor of claim 1 wherein said periods are of equal time.

6. The method of calibrating a DC motor of claim 5 wherein said periods are approximately equal to two milliseconds.

7. The method of calibrating a DC motor of claim 1 further comprising the step of repeating each of said tests.

8. The method of calibrating a DC motor of claim 7 further comprising the step of applying a startup PWM duty cycle of sufficient magnitude to insure motion of said motor prior to repeating said tests.

9. The method of calibrating a DC motor of claim 1 wherein said tests are generally conducted in order from low duty cycles to high duty cycles.

10. The method of calibrating a DC motor of claim 1 wherein each of said periods is characterized by a chopping period, said chopping period being between 10 and 100 microseconds in length.

11. The method of calibrating a DC motor of claim 1 further comprising the steps of:
   a) repeating each of said tests in the same order, recording an independent array of results; and
   b) discarding for each value of PWM all but the array exhibiting the lowest average current value, prior to calculating the apparent resistance of the motor.

12. The method of calibrating a DC motor of claim 1 further comprising the step of applying a voltage to move said motor to a known stop-point.

13. A method of calibrating a DC motor, comprising the steps of:
   a) choosing at least one direct current voltage of interest;
   b) applying a startup direct current voltage of sufficient magnitude to insure motion of said motor;
   c) performing a first test wherein the first chosen voltage is applied in at least two periods, each of said periods being of opposite polarity from the period preceding it, and the current in the motor is measured during each of said periods;
   d) performing an additional test for each chosen voltage of interest, wherein each of said voltages is applied in at least two periods, each of said periods being of opposite polarity from the period preceding it, and the current in the motor is measured during each of said periods; and
   e) calculating the apparent resistance of the motor.

14. The method of calibrating a DC motor of claim 13 wherein at least two voltages of interest are chosen.

15. The method of calibrating a DC motor of claim 2, wherein a first chosen PWM duty cycle value is below 50 percent and a second chosen PWM duty cycle value is above 50 percent.

* * * * *